UNITED STATES PATENT OFFICE.

EDWIN C. ECKEL, OF WASHINGTON, DISTRICT OF COLUMBIA.

PROCESS OF PRODUCING METALLIC IRON AND ALKALINE SALTS.

1,011,173.  Specification of Letters Patent.  Patented Dec. 12, 1911.

No Drawing.  Application filed April 3, 1911. Serial No. 618,611.

*To all whom it may concern:*

Be it known that I, EDWIN C. ECKEL, a citizen of the United States, residing at Washington, District of Columbia, have invented certain new and useful Improvements in Processes of Producing Metallic Iron and Alkaline Salts, of which the following is a specification.

This invention comprises a process for the simultaneous production of metallic iron and alkaline salts.

The process is one in which metallic iron (pig iron) and alkaline salts (principally potassium carbonate) are produced simultaneously by the fusion of a mixture consisting essentially of silica, lime carbonate, iron oxid and potassium. So far as my knowledge goes, this metallurgical operation has never been attempted or even suggested prior to my invention thereof. It is technically feasible and commercially profitable.

The raw materials preferably employed as constituents of the mixture are glauconite and limestone. Glauconite is a silicate of iron and potassium, occurring naturally in extensive deposits which are at present practically unused for any purpose. Omitting non-essential ingredients, its average composition is about 50% silica, 30% iron oxid, 6% potassium, some phosphorus, and 10% water. Alumina is also usually present as an impurity. It has heretofore never been regarded as a possible commercial source of metallic iron, owing to its relatively low percentage of iron oxid and high percentage of silica. But the commercial impracticability disappears when it is shown that it is feasible to extract both iron and potassium from it in a single operation, and this I have been able to accomplish.

The process employed includes the fusion, in a furnace of suitable construction, of a mixture of glauconite and limestone; the tapping off of the molten iron and of the fused slag separately; and the recovery of alkaline salts, principally potassium carbonate, from the gases evolved during the smelting process.

In practice, assuming for the moment that an ordinary blast-furnace is used, it will be charged with glauconite, limestone and coke. The amount of limestone in the charge will be sufficient to form a readily fusible slag when combined with the silica and alumina of the glauconite and the ash of the coke. The amount of coke to be used will be that sufficient to accomplish reduction and fusion. In using the word charge I do not wish to be understood as implying that the process is necessarily an intermittent one, practiced on individual charges; on the contrary, if an ordinary blast-furnace is employed, the process may be absolutely continuous. Also, though mentioning coke as the fuel, and limestone as the flux employed in this illustration, I expressly state that other fuels or other fluxes could be employed without in any way passing out of the field of this invention and process. When the charge, made up of raw materials as above described, is heated to a proper state of fusion, the iron contained in its constituents will be reduced, and sink to the bottom of the furnace in a molten state; the silica, lime, etc., will combine as a fusible slag floating on the iron; and the volatile potassium, sodium, etc., will join the products of combustion in gaseous form. The metallic iron is tapped off; the slag is drawn in similar fashion; and the alkaline salts are recovered from the gases. This last mentioned step in the operation may be accomplished by either wet or dry methods, or by a combination of both. In practice it will be probably most economical, under ordinary conditions, to extract the potassium by means of a dust-catcher, taking advantage of the fact that as the gases cool in passing away from the furnace, the potassium will condense in fine particles, usually in the form of potassium carbonate. The bulk of the potassium originally contained in the charge can be recovered very inexpensively in this way. Wet methods of extracting or recovering it from the gases are of course theoretically more satisfactory, but in practice the dry recovery will probably be found most profitable.

When a furnace is run on a mixture of glauconite, limestone and coke, as assumed in the preceding illustration, the relative proportions of the three different raw materials might be about as follows: ten tons of glauconite, seven and a half tons of limestone, and five tons of coke. Treating these quantities as making up a separate charge of twenty-two and a half tons of raw material, this charge will yield slightly over two tons of pig-iron, and considerably over a ton of potassium carbonate. It will also yield, incidentally, about ten tons of slag.

As this slag will have the approximate composition 53% silica, 3% alumina and 44% lime, it will be serviceable as a raw material in various industries.

It may be added that, owing to the percentage of phosphoric acid usually contained by glauconite, the pig-iron produced by this process will be normally a high-phosphorus pig, specially suited for the basic Bessemer process and for other uses. If commercially desirable, the process can be modified by adding as a fourth ingredient of the charge, a certain percentage of iron ore, with the object of increasing the iron yield or of varying the phosphorus content of the pig.

Having thus described my invention, what I claim as new and desire to secure by Letters Patent is:—

1. The process of producing iron and alkaline salts, comprising fusing a natural alkaline iron silicate with fuel and a flux until the iron is reduced and the alkaline salts are volatilized, and recovering said salts evolved.

2. The process of producing iron and alkaline salts, comprising fusing glauconite with reducing and fluxing materials until the iron is reduced and the alkaline salts are volatilized, and recovering said salts evolved.

3. The process of producing pig-iron and potassium salts, comprising fusing a mixture of a natural potassium-iron silicate, flux and fuel until the iron is reduced and the potassium salts are driven off as gas, drawing off the molten iron, and recovering said salts from the gas.

4. The process of producing iron and potassium salts, comprising fusing a mixture containing glauconite, limestone and fuel until the iron is reduced and the potassium salts are evolved, separating the molten iron from the mass, and recovering the said salts so evolved.

In testimony whereof, I affix my signature in presence of two witnesses.

EDWIN C. ECKEL.

Witnesses:
GEO. E. TEW,
C. W. FOWLER.